United States Patent [19]

Birkenbach et al.

[11] 4,180,135

[45] Dec. 25, 1979

[54] HYDRAULIC ANGLING MECHANISM FOR DISC HARROW GANGS

[75] Inventors: Eugen J. Birkenbach, Park Ridge; Robert D. Woodworth, Clarendon Hills, both of Ill.

[73] Assignee: International Harvester Company, Chicago, Ill.

[21] Appl. No.: 593,511

[22] Filed: Jul. 7, 1975

[51] Int. Cl.² ............................................. A01B 21/02
[52] U.S. Cl. .................................. 172/407; 172/398; 172/414; 172/580; 172/594
[58] Field of Search ............... 172/594, 596, 597, 584, 172/585, 586, 580, 407, 240, 414, 244, 397, 398, 595

[56] References Cited

U.S. PATENT DOCUMENTS

| | | | |
|---|---|---|---|
| 2,263,089 | 11/1941 | Hornish | 172/580 |
| 2,579,086 | 12/1951 | Oehler | 172/580 |
| 2,667,724 | 2/1954 | Johnson et al. | 172/580 X |
| 2,725,701 | 12/1955 | Gunyou | 172/594 |
| 2,760,323 | 8/1956 | Cooper | 172/580 X |
| 2,881,578 | 4/1959 | Oehler et al. | 172/397 |
| 3,014,541 | 12/1961 | Oehler et al. | 172/397 X |
| 3,021,906 | 2/1962 | Youngberg | 172/397 |
| 3,080,933 | 3/1963 | Kramer et al. | 172/594 X |
| 3,193,023 | 7/1965 | Adee | 172/594 X |
| 3,590,928 | 7/1971 | Mirus | 172/580 |

*Primary Examiner*—Paul E. Shapiro
*Attorney, Agent, or Firm*—F. David AuBuchon

[57] ABSTRACT

Hydraulic mechanism for varying the angular relationship between a pair of adjacent end-connected disc harrow gangs which uses the same power source that ordinarily is employed for raising and lowering the harrow frame structure as a power source to actuate the gang angling mechanism. A bell crank lever mechanism embodying a pivot shaft, trailing wheel axle arms, and a crank arm, has the latter arm connected to the power source so that when the crank arm is swung in opposite fore and aft directions, the frame structure is raised or lowered. The gang angling mechanism embodies floating links which are connected at one end to the crank arm and which pass slidingly through the pivotal juncture between the end-connected gangs, together with removable abutment members which, when applied to the floating links in the vicinity of such junctures, engages the latter when the power source is actuated in one direction or the other and forces the juncture in a direction either to increase or decrease the angular gang relationship, depending upon whether the abutment members are applied forwardly or rearwardly of the juncture.

10 Claims, 9 Drawing Figures

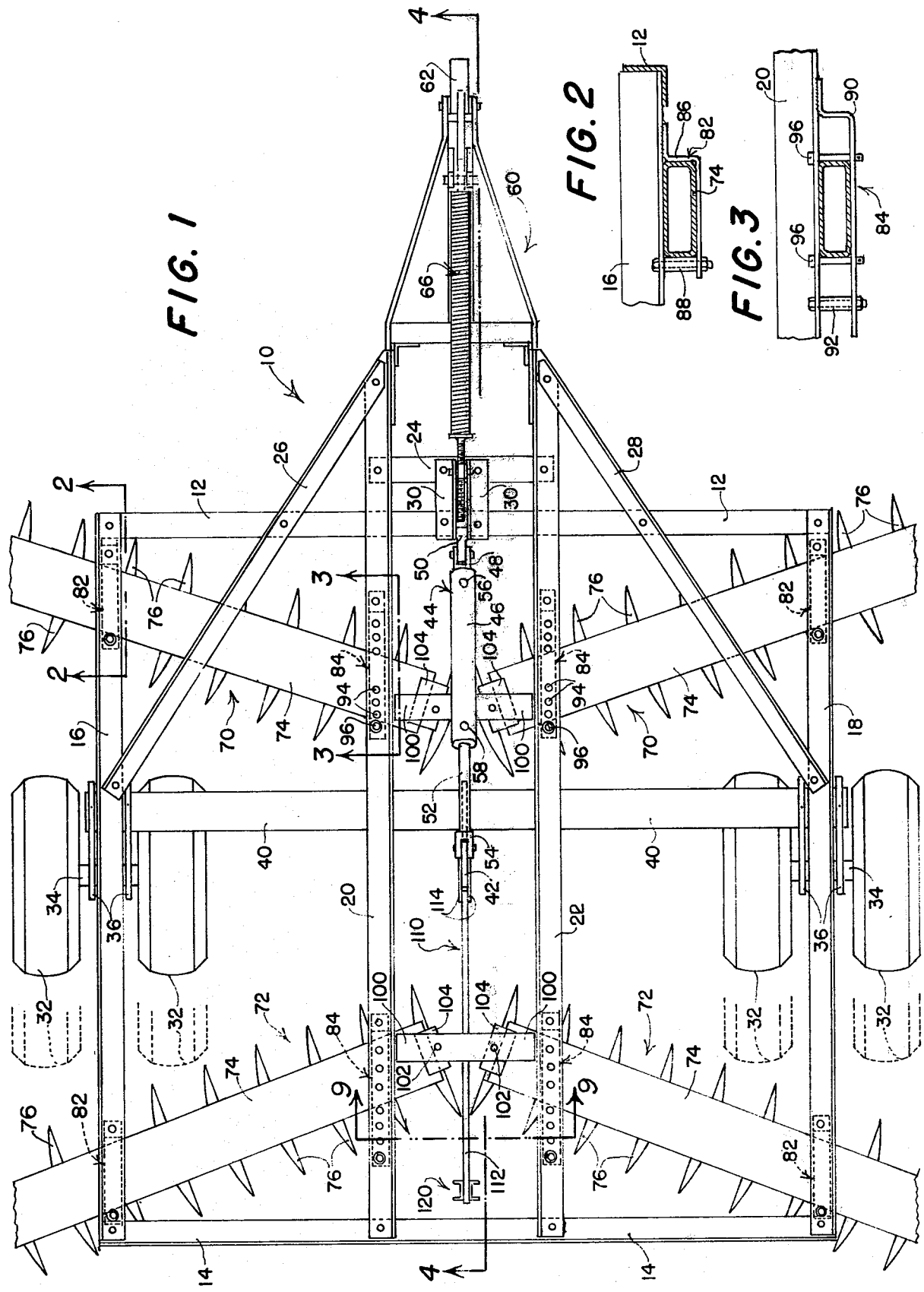

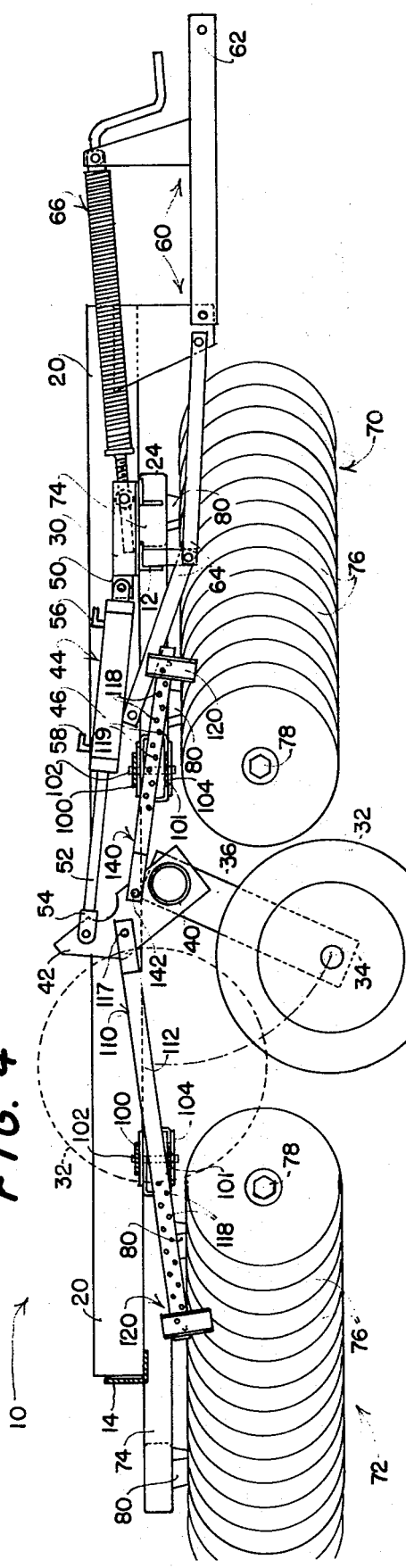
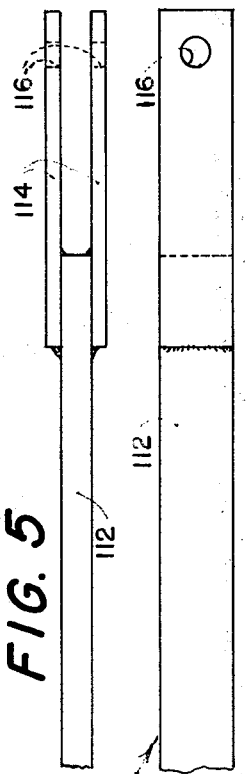
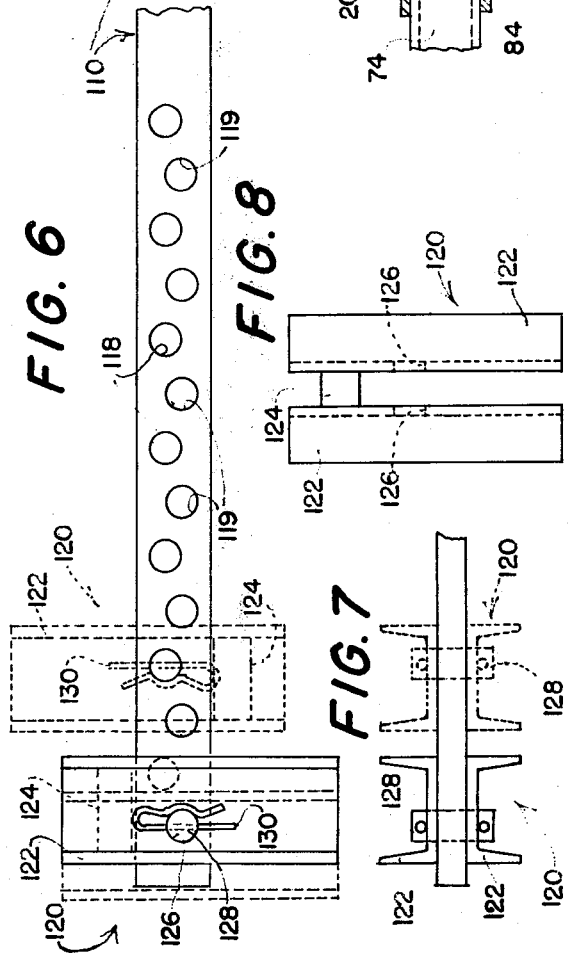
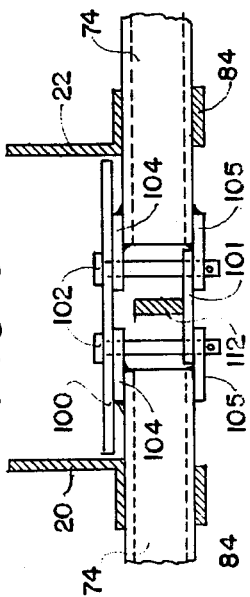
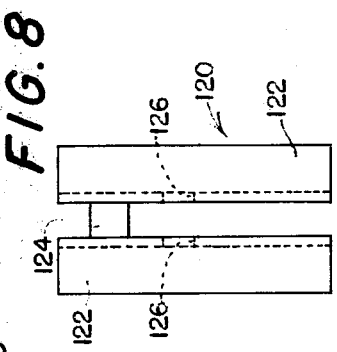
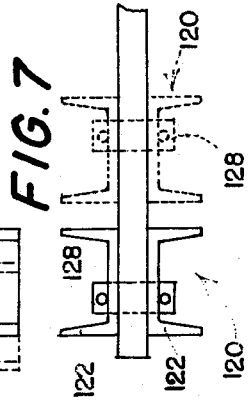

HYDRAULIC ANGLING MECHANISM FOR DISC HARROW GANGS

BACKGROUND OF THE INVENTION

The present invention relates to disc harrows and has particular reference to a tandem disc harrow having front and rear pairs of disc gangs and of the type including a frame structure, together with a bell crank lever arrangement embodying a pivot shaft, trailing wheel axle arms, and a crank arm which, when swung in a fore and aft direction, causes the frame structure to become either raised or lowered, depending upon the direction of swinging movement. Still more particularly, the invention is concerned with such a disc harrow wherein crank arm movement is effected under the control of an hydraulic piston and cylinder assembly.

Tandem disc harrows of the general character outlined above and which employ front and rear pairs of disc gangs which are angularly adjustable to vary the included angle between adjacent gangs and thus vary the cultivation pattern are generally known. The purpose of adjusting the included angle is to vary the cultivation pattern, as well as to vary the width of the individual furrows created by the disc blades.

One currently employed method of varying the included angle between adjacent disc gangs embodies the use of gang beams which are interconnected in end-to-end fashion by connector plates at the apex of the included angle and which have their intermediate portions slidingly confined in the outer regions of the frame structure so that when a particular connector plate is moved in one longitudinal direction along the axis of the harrow, the included angle will be varied either to increase or decrease such angle, depending upon whether the front pair of disc gangs or the rear pair of disc gangs are concerned, and upon whether the connector plates are shifted forwardly or rearwardly. It is to this particular type of disc harrow and method varying the included angle between adjacent gang beams that the invention specifically relates.

Heretofore it has been customary to shift the connector plates at the juncture region between adjacent gang beams manually by the use of adjusting screw or worm drive mechanisms, such mechanisms possessing at least one disadvantage that considerable manual strength is required to actuate the same. Moreover, the provision of an extraneous hydraulic cylinder for the sole purpose of gang angling is relatively costly and requires an additional hydraulic circuit which often is not available.

The present invention is designed to overcome the above-noted limitations that are attendant upon the construction and use of present day tandem disc harrows having facilities for varying the included angle between adjacent disc gangs and, toward this end, the invention contemplates the provision of a novel arrangement whereby the piston and cylinder assembly which is utilized for swinging the bell crank lever arrangement including the aforementioned pivot shaft, trailing wheel axle arms and crank arms, is also used in a selective manner to shift the connector plates of either the front or rear pair of disc gangs, each to the exclusion of the other, and in either a forward or a rearward direction, to thereby initiate either an increase or a decrease in the included angle of the associated pair of disc gangs. Moreover, the invention further embodies means whereby extremely small measured increments of beam angle adjustment may be effected as desired.

As will become more readily apparent when the nature of the invention is better understood, operator-control of the hydraulic cylinder is effected so that only that portion of the stroke of the cylinder plunger which takes place during raising or lowering of the frame structure after the disc blades have left the ground, or before they enter the ground, is used for connector plate shifting operations. The operator is thus able to measure small increments of angle change and apply them to the disc gangs by observing the motion of the disc blades from the time they leave the ground until the time they are fully raised, or vice versa.

The provision of a disc harrow which embodies such facilities for varying the included angle between adjacent disc gangs constitutes the principal object of the present invention. Numerous other objects and advantages of the invention, not at this time set forth, will become readily apparent as the following description ensues. In such description and in the appended claims, the term "angling" will be employed to indicate connector plate shifting operations which result in decreasing the included angle between adjacent disc gangs, while the term "deangling" will be employed to indicate connector plate shifting operations which result in increasing such included angle or, in other words, straightening out the adjacent disc gangs toward positions of end-to-end alignment.

DESCRIPTION OF THE DRAWINGS

In the accompanying two sheets of drawings forming a part of this specification, one illustrative embodiment of the invention has been shown.

FIG. 1 is a top plan view of a disk harrow embodying the improved power-actuated means for varying the angular relationship of the disc gangs relative to the longitudinal axis of the harrow;

FIG. 2 is a longitudinal sectional view taken substantially on the line 2—2 of FIG. 1;

FIG. 3 is a fragmentary sectional view taken substantially on the line 3—3 of FIG. 1;

FIG. 4 is a fragmentary sectional view taken substantially on the line 4—4 of FIG. 1;

FIG. 5 is a fragmentary edge or top plan view of a combined tension and compression link employed in connection with the present invention;

FIG. 6 is an extended side elevational view of the tension and compression line shown in FIG. 1;

FIG. 7 is a fragmentary top plan view of the free terminal end portion of the tension and compression link shown in FIGS. 5 and 6;

FIG. 8 is a side elevational view of an abutment member employed in connection with the invention; and FIG. 9 is an enlarged sectional view taken substantially on the line 9—9 of FIG. 1.

Referring to the drawings in detail, and in particular to FIGS. 1 and 4, the present invention is illustrated herein in connection with a tandem type disc harrow which is designated in its entirety by the reference numeral 10. The disc harrow involves in its general organization a generally rectangular frame structure provided with front and rear transverse frame members 12 and 14 respectively, and longitudinally extending, parallel, spaced apart outside frame members 16 and 18. The frame structure further embodies an intermediate centrally located frame portion which is comprised of elongated longitudinally extending, spaced apart inside frame members 20 and 22 the rear ends of which are secured in any suitable manner to the rear frame member 14 and the forward end regions of which overhang the front frame member 12 and are suitably secured together by a relatively short frame piece 24. All of the aforementioned frame members are preferably in the form of angle pieces. A structural frame member 26, which also is preferably in the form of an angle piece, extends between the extreme forward end of the intermediate longitudinal frame member 20 and a medial region of the outside frame member 16 and a similar frame member 28 extends between the inside and outside frame members 22 and 18 respectively, and is similarly positioned relative thereto. The two frame members 26 and 28 are inclined relative to the longitudinal axis of the disc harrow and also have their medial regions secured to the medial regions of the front frame member 12 and thus serve in the manner of struts to rigidify the entire frame structure.

A pair of short longitudinally extending angle pieces 30 which are closely spaced on opposite sides of the longitudinal axis of the disc harrow extend between the frame members 24 and 12, constitute additional fixed frame members and also serve a function that will be made clear presently.

Traction wheel supporting means in the form of spaced pairs of wheels 32 mounted on wheel axles 34 carried on the distal or outer ends of dual trailing axle arms 36, the inner or proximate ends of such arms being fixedly secured to a transverse tubular pivot shaft 40 which is of hollow rectangular construction and which extends beneath the frame structure and is suitably supported on the outside frame members 14 and 16 by bearing assemblies (not shown) in a manner well known in the art. A pivot shaft actuating crank arm or lever 42 has its lower or proximate end welded or otherwise fixedly secured to the mid-region of the pivot shaft 40 and normally extends upwardly therefrom with a rearward degree of inclination on the order of approximately 45° as best seen in FIG. 4. The axle arms 36, pivot shaft 40 and crank arm 42 thus, in effect establish a bell crank arrangement. A fluid-actuated cylinder and plunger assembly 44 is provided for the purpose of actuating the crank arm 42, and consequently the entire bell crank arrangement, such assembly including a cylinder 46 having a clevis connection 48 with an anchor block 50 which is fixedly supported by welding or the like between the rear ends of the two angle pieces 30, and a plunger 52. The forward end of the plunger is connected by a clevis connection 54 to the upper end region of the crank arm 42. As will be described in greater detail presently, when fluid is supplied to the forward end of the hydraulic cylinder 46 through a fluid port 56 the plunger 52 will be projected in such a manner as to swing the pivot shaft 40 in a counterclockwise direction as viewed in FIG. 2, thus forcing the traction wheels 32 downwardly to raise the frame structure bodily. When fluid is supplied to the rear end of the assembly 44 through a fluid port 58, the plunger 52 will be retracted so as to swing the pivot shaft 40 in a clockwise direction, thus lowering the frame structure.

A conventional coupling hitch assembly which is designated in its entirety by the reference numeral 60 is secured to the forward ends of the longitudinal inside frame members 20 and 22, such assembly embodying the usual draw link 62 and tension struts or links 64, together with a spring biased or restrained crank-actuated mechanism 66 whereby the draw link 62 may be raised or lowered for coupling or uncoupling operations in connection with a draft vehicle such as a tractor or the like.

The harrow frame structure of the disc harrow 10 serves to support front and rear pairs of disc gangs which are angularly adjustable so that the areas disced by such gangs may be varied as desired. Accordingly, the disc harrow 10 includes a forward pair of disc gangs, each of which is designated by the reference numeral 70, and a rear pair of disc gangs, each of which is indicated generally at 72.

Each of the forward disc gangs embodies an elongated beam 74 which serves to support a plurality of concave disc blades 76 which are rotatably carried in spaced relationship on a support shaft 78 (FIG. 4) which is suspended from the beam 74 in parallel relation by means of the usual standards 80. The disc blades 76 are supported so that their concave surfaces are directed outwardly from the central longitudinal axis of the harrow and are maintained in their spaced relationship by intervening spools (not shown) in a well known manner.

Still referring to FIGS. 1 and 4, and additionally to FIGS. 2 and 3, each beam 74 of the forward disc gangs 70 is loosely and slidingly supported in outer and inner suspension hanger assemblies 82 and 84 respectively, the inner assembly 82 being fixedly mounted on the underneath side of the forward region of the associated inner longitudinal frame member 20 or 22, as the case may be, and the outer assembly 84 being fixedly mounted on the underneath side of the forward region of the associated outer longitudinal frame member 16 or 18 as the case may be.

One of the two outer suspension assemblies 82 is shown in FIG. 2 and it consists simply of a Z-shaped length 86 of flat metal stock welded or otherwise secured at one end to the underneath side of the associated frame member 16 and held in position at its other end by a nut, bolt and spacer arrangement 88. The distance between the latter arrangement 88 and the web portion of the Z-shaped length 86 of metal stock is such that it will permit a limited degree of angular swinging movement of the associated gang beam 74 at the region where the latter passes through the suspension assembly 82 as well as a degree of axial sliding movement thereof. The other suspension assembly is substantially identical to the described assembly 82 except for the fact that the Z-shaped length 86 of stock is secured to the underneath side of the frame member 18.

One of the two inner suspension assemblies 84 is shown in FIG. 3 and it is similar to the outer suspension assemblies 82 except for the fact that the Z-shaped length of metal stock 90 which is associated therewith is somewhat longer than the member 86 so that the distance between the nut, bolt and spacer arrangement 92 and the web of the Z-shaped length 90 is greater than is the distance between the corresponding elements of the outer suspension members, thereby allowing not only for limited swinging and axial sliding movement of the beam 74, but also for forward and rearward shifting motion of the portion of the beam that passes through the suspension assembly 84. Vertically aligned pairs of bolt holes 94 (FIG. 1) are formed in the Z-shaped member 90 and its overlying frame member 20 for selective reception of anchor or locking pins 96 (see also FIG. 3) therethrough in a manner and for a purpose that will be made clear presently.

As best shown in FIG. 1, the suspension hanger assemblies 82 on the outer frame members 16 and 18 are disposed an appreciable distance forwardly of the suspension hanger assemblies 84 on the inner frame members 20 and 22, the positioning of such hanger assemblies being such that the two disc-supporting beams 70 which pass therethrough are capable of being shifted between the fully angled positions wherein they are shown in FIGS. 1 and 4 and fully deangled positions wherein the two beams are in substantial alignment. The adjacent ends of the gang beams 74 are connected together by means of a pair of connector plates including an upper plate 100 and a lower plate 101 (FIGS. 1 and 9) which are pivotally secured by pins 102 to upper and lower extension plates 104 and 105 on the inner or adjacent ends of the two front gang beams 74. The length of the gang connector plate 100 is such that its opposite ends closely approach the two intermediate or inner longitudinal frame members 20 and 22. These frame members thus serve as a guide means whereby the connector plate 100 may be shifted longitudinally in a fore and aft direction between such frame members without side sway, thus guarding against any endwise motion of the disc gangs 70 and insuring a straight linear cutting action by each of the front disc blades 76 when the harrow 10 is in operation.

Referring now to FIGS. 1 and 4, the pair of rear disc gangs 72, as well as the mounting and interconnecting arrangements therefor, are substantially identical with the pair of front disc gangs 70 and their mounting arrangements. Therefore, in order to avoid needless repetition of description, identical reference numerals have been applied to the corresponding elements of both pairs of disc gangs 70 and 72, as well as to the corresponding elements of the mounting arrangemetns therefor, it being noted, however, that the disc blades 76 of the rear disc gangs 72 are supported from the standards 80 so that their convex surfaces are directed outwardly from the central longitudinal axis of the harrow 10. It is also to be noted that the outer suspension hanger assemblies 82 on the frame members 16 and 18 are disposed an appreciable distance rearwardly of the inner suspension hanger assemblies 84 so that when the rear gangs 72 are fully angled as shown in FIG. 1, the angling thereof is reversed from the direction of angling of the front gang assemblies 70. More specifically, full angling of the front gangs 70 results in an obtuse angle arrangement on the order of 145° wherein the individual gang beams 74 slope forwardly and outwardly away from such longitudinal axis of the harrow.

The arrangement of parts thus far described is, in a general sense, conventional, although specifically such parts may differ from the corresponding parts of known commercial harrows currently in use. Therefore, no claim is made herein to any novelty associated with the same, the novelty of the present invention residing rather in a novel power angling means for the front and rear disc gangs wherein the hydraulic cylinder 44 which actuates the crank arm or lever 42 for the frame raising and lowering purposes is also employed for selectively shifting the aforementioned gang connector plates 100 of the front and rear pair of gangs 70 and 72, either individually or simultaneously and in either longitudinal direction to vary the included gang angle between the two gangs which are associated with each pair of connector plates 100.

Accordingly, and with reference to FIGS. 4 to 9 inclusive, angling and deangling of the rear pair of disc gangs 72 is effected by means of a floating linkage connection which is effective between the connector plate 100 associated with the gang beams 74 of such rear pair of gangs and with the crank arm 42. This linkage connection is in the form of an elongated floating link member 110 which, during deangling of the rear beams 72, functions in compression as a thrust link and which, during angling of such beams, functions in tension as a pull link. The member 110 is shown in detail in FIGS. 5 and 6 and comprises a length 112 of rectangular bar stock to which plates 114 are affixed at its forward end, thus establishing a fork arrangement which is provided with aligned holes 116 (FIGS. 5 and 6) for reception therethrough of a pivot pin 117 (FIG. 4) by means of which the forward end of the member is pivotally secured to crank arm 42 at a medial region of the latter. The rear end region of the floating link member 110 is formed with a series of staggered holes including an upper row of holes 118 and a lower row of holes 119, the function of which will be made clear presently.

The medial region of the floating link member 110 passes between the upper and lower connector plates 100 and 101 as best shown in FIG. 9 and thus the member 110 floatingly traverses the juncture region between the two rear disc gangs 72 with the length 112 of bar stock normally resting upon the lower connector plate 101. Thus, it will be apparent that as the piston cylinder assembly 44 is actuated either to project or to retract the plunger 52 thereof, the medial region of the member 112 will slidingly traverse the aforementioned juncture region between the rear disc gangs 72 in one longitudinal direction or the other.

Referring now to FIGS. 6, 7 and 8, the perforated rear end region of the member 110 is adapted to receive thereon an abutment member 120 which is in the form of a pair of short channels or side pieces 122 disposed in back to back relationship and maintained in spaced apart relationship by an intervening spacer member 124. The abutment member 120 thus is of saddle like construction and it is adapted to be received over the perforated region of the member 110 and with the channels 122 straddling the latter. Aligned holes 126 are formed in the channel webs and are adapted to receive therethrough a fastening pin 128 which is caused to also pass through selected holes 119 in the link 110 when the abutment member 120 is disposed in the upright position in which it is shown in full lines in FIG. 6. By inverting the member 120 as shown in dotted lines in this view, the fastening pin may be caused to pass through selected holes 118 in such member. It is to be noted that in either instance, whether the abutment be upright or inverted, the distance between the spacer member 124 and a selected hole is such that the saddle member will seat squarely against a longitudinal edge of the link 110 so that there will be no lost motion or freedom of movement of the saddle member on the link.

It is to be noted at this point that the holes 126 (FIG. 6) in the web portions of the channels or side pieces 122 are not disposed mid-way between the channel flanges. Instead they are disposed closer to one channel flange than they are to the other channel flange. By such an arrangement, the saddle-like abutment member 120 may be applied to the member 110 with the side flanges thereof reversed from front to rear across the link member 110 to effect additional smaller increments of longitudinal placement of the abutment member 120 along the floating bar-like member 110, whether the abutment member 120 be upright or inverted.

In the operation of the herein described gang angling and deangling mechanism for the rear gangs 72, if it is desired to angle such gangs toward their positions of minimum included angle, the hydraulic cylinder 44 will be actuated to project the plunger 52 and thus swing the crank arm 42 rearwardly until the frame structure assumes its fully elevated position which is commonly referred to as the "wheels down" position and which is illustrated in FIG. 4. Thereafter, the abutment member 120 will be installed upon the floating link member 110 in the manner previously described at a selected region thereon rearwardly of the connector plates 100 and 101 and a close thereto as possible, utilizing either or both of the previously described adjustments on the link member 110. The locking pins 96 will then be removed from the holes 94 and the cylinder 44 actuated to retract the plunger 52 and thus swing the crank arm 42 forwardly, thereby placing the floating link 110 under tension and initiating a lowering of the frame structure, while at the same time the abutment member 120 will be pulled forwardly against the connector plates 100 and 101, thereby urging the gang beams 74, and consequently the gangs 72, in an angling direction in the manner previously described. If such an initial impulse of the cylinder 44 is insufficient to effect full angling of the gangs 72 by the time that the disc blades touch the ground, the cylinder will again be actuated to project the plunger 52 and thus raise the frame structure, after which the abutment member 120 will be re-positioned on the floating link member 110 immediately behind the connector plates 100 and 101 and the sequence of operation repeated until the disc blades 76 again touch the ground. Further repetitions of this sequence of operations may be necessary to bring the gangs 72 to their fully angled positions, each operation serving to effect a small increment of gang angling.

It is to be noted at this point that each increment of gang angling is effected while the disc blades 74 are out of the ground and while they move downwardly between their fully raised positions and positions wherein they merely touch the ground.

Gang deangling of the rear gangs 72 is accomplished in a similar step-by-step fashion, the cylinder 44 being initially actuated so that the plunger 52 will be partially extended at the commencement of each gang movement and to a degree sufficient to cause the disc blades 76 to just clear the ground, or nearly clear the same. However, instead of positioning the abutment member immediately rearwardly of the connector plates 100 and 101, such abutment member is installed upon the floating link member 110 immediately forwardly of these connector plates so that actuation of the cylinder 44 to fully project the plunger 52 will raise the frame structure while at the same time imparting an increment of gang deangling to the gangs 72, it being understood of course that the locking pins 96 will be removed from the holes 94 prior to such deangling motion of the gangs. This sequence of operation may also be repeated without replacing the locking pins until such time as the gangs 72 have become fully deangled. As was the case with angling operations, each increment of gang deangling will take place while the disc blades 76 are out of the ground but are moving upwardly toward their fully raised positions instead of downwardly.

Referring now to FIG. 4, angling and deangling of the front pair of disc gangs 70 is effected by means of a floating link connection which is effective between the connector plate 100 associated with the gang beams 74 of such gangs 70 and the crank arm 42. This linkage connection is in the form of an elongated floating link member 140 which is similar to the floating link member 110 for the rear disc gangs 72 but which is of somewhat shorter extent. The link member 140 functions in compression as a thrust link during deangling of the front gangs 70 and functions in tension as a pull link during angling of such front gangs. Due to the similarity between the floating link member 140 and the floating link member 110, it is not deemed necessary to illustrate the member 140 in enlarged detail but it will be understood that the member is provided with fork plates and staggered holes which are similar to the fork plate 114 and 118 of the floating link member 110 and which have been similarly designated by reference numerals.

The floating link member 140 is reversed relative to the position of the floating link member 110, which is to say that the fork arrangement 114 is pivoted to a medial region of the crank arm 42 by a pin 142 so that the member 140 extends forwardly and floatingly or slidably projects through the juncture region between the two front disc gangs 70 in order that when an abutment 120 is applied to the member 140 it will cooperate with the upper and lower connector plates 100 and 101 thereof in the manner previously described in connection with the abutment member on the floating link member 110.

In the operation of the gang angling and deangling mechanism for the front gangs 70, if it is desired to angle such gangs toward their positions of minimum included angle, the cylinder 44 will be actuated to retract the plunger 52 and thus swing the crank arm 42 forwardly until the frame structure assumes a position wherein the disc blades 76 are about to enter the ground. At this point the front pair of locking pins 96 will be removed and an abutment member 120 will be installed upon the floating link member 140 at a point wherein it lies forwardly of, and as close as possible to, the connector plates 100 and 101. Thereafter the cylinder 44 will be actuated to project the plunger 52 and cause the crank arm 42 to swing rearwardly, thereby placing the floating link member 140 under tension and causing the connector plates 100 and 101 to shift rearwardly until the plunger 52 becomes fully projected. This sequence of operations may be repeated, if necessary, until the desired gang angle has been attained, after which the locking pins 96 may be replaced.

If it is desired to deangle the front gangs 70, the piston and cylinder assembly 44 will be actuated to project the plunger 52 and thus bring the harrow to its "wheels down" position so that the frame structure will become fully elevated. Thereafter, upon removal of the locking pins 96, the abutment member 120 will be placed on the floating link member 140 rearwardly of the connector plates 100 and 101 and as close thereto as possible, after which retraction of the plunger 52 will serve to shift the abutment member 120 and connector plates 100 and 101 forwardly, thereby widening the angle between the disc gangs 70. The sequence of operation may be repeated as desired until the desired gang angle has been attained, after which the locking pins 96 may be removed.

It will be understood that, ordinarily, such gang angling or deangling of either the front gangs 70 or the rear gangs 72 will take place, each to the exclusion of the other, since no situation would be likely to arise where simultaneous gang angling or deangling of the front and rear gangs is needed. In either instance, the unused abutment member 120 may be left in an out-ofthe-way position on the floating link member 110 or 140, as the case may be, where movement of the plunger 52 and consequent swinging movement of the crank arm 42 will not bring it into contact with the associated connector plates 100 and 101.

Apart from the angling and deangling features of the present invention, the abutment member 120 associated with the rear floating link member 110 may be used as a depth gauge stop or limit member by installing it on the link member 110 at a selected position toward the rear of the latter while allowing the locking pin 96 to remain installed. The abutment members 120 may also be used, by appropriate placement thereof on the floating links, to lock the wheels in their transport positions.

The invention is not to be limited to the exact arrangement of parts shown in the accompanying drawings or described in this specification since various changes in the details of construction may be resorted to without departing from the spirit of the invention. Therefore, only insofar as the invention has particularly pointed out in the accompanying claims is the same to be limited.

What is claimed is:

1. In a disc harrow of the type having a generally rectangular frame structure including a pair of spaced outside main longitudinal frame members and a pair of inside longitudinal intermediate frame members, pairs of front and rear disc gangs operatively associated with said frame structure on generally opposite sides of said intermediate frame members and having gang beams which are arranged in end-to-end relationship and carry disc blades designed for engagement with the ground, suspension means between said outside main longitudinal frame members and said gang beams providing a sliding pivot for the latter relative to the former, suspension means between said inside longitudinal intermediate frame member and said gang beams permitting sliding therebetween, a connector device extending between adjacent ends of the gang beams of each pair and adapted upon longitudinal shifting movement thereof to effect a change in angular relationship of the associated pair of disc gangs, a transverse pivot shaft mounted on said frame structure, having trailing wheel axle arms and a crank arm extending radially therefrom, said axle arms, pivot shaft and crank arm establishing, in effect, a bell crank arrangement whereby forward and rearward swinging movement of the crank arm will effect lowering and raising of the frame structure to bring the disc blades into and out of engagement with the ground, and an hydraulic cylinder effective between the frame structure and crank arm to swing the latter in opposite directions, the improvement which comprises: a floating link pivoted at one end to said crank arm and projecting slidingly through one of said connector devices, and an abutment member adapted for selective positioning lengthwise on said floating link forwardly and rearwardly of said one connector device and engageable therewith for longitudinal shifting thereof upon actuation of said cylinder, and cooperating means on said link and abutment member whereby the latter may be releasably mounted on the former in selected positions of longitudinal adjustment.

2. A disc harrow as set forth in claim 1, wherein said means for releasably mounting the abutment member on the floating link embodies a plurality of closely and longitudinally spaced holes in the link and at least one hole in the abutment member designed for selective register therewith, and a fastening pin designed for removable reception in registering holes in the link and abutment members.

3. A disc harrow as set forth in claim 2, wherein said abutment member is of saddle-like construction and embodies vertical side pieces which are adapted to straddle the link and aligned holes are provided in the side pieces for reception of said fastening pin when the abutment member is fully seated upon the link.

4. A disc harrow as set forth in claim 3, wherein said aligned holes in the side pieces are offset from the central axis of the abutment member whereby, when the latter is reversed upon the link from front to rear, its effective longitudinal position on the latter will be changed.

5. A disc harrow as set forth in claim 1, wherein said means for releasably mounting the abutment member on the floating link embodies upper and lower longitudinally extending rows of spaced apart holes in said link, said abutment member is of saddle-like construction and embodies vertical side pieces which are adapted to straddle the link, and aligned holes are provided in the side pieces, said latter holes being designed for selective register with the holes of said lower row when the abutment member is applied to the link in an upright position and being designed for selective register with the holes in the upper row when the abutment member is applied to the link in an inverted position.

6. A disc harrow as set forth in claim 5, wherein the holes in said rows are staggered relative to one another.

7. A disc harrow as set forth in claim 6, wherein said aligned holes in the side pieces are offset from the central axis of the abutment member, whereby when the latter is reversed upon the link from front to rear its effective longitudinal position will be changed.

8. A disc harrow as set forth in claim 1 including, additionally, a second floating link member pivoted at one end to said crank arm and projecting slidingly through the other connector device, a second abutment member adapted for selective positioning lengthwise on said latter link member forwardly and rearwardly of said other connector device and engageable therewith for longitudinal shifting thereof upon actuation of said cylinder, and cooperating means on said second floating link member and second abutment member whereby the latter may be releasably mounted on the former in selected positions of longitudinal adjustment.

9. A disc harrow as set forth in claim 1, wherein said one connector device embodies vertically spaced upper and lower connector plates each of which is pivotally connected to the adjacent ends of the associated pair of gang beams, and the floating link member projects between said connector plates and is slidingly supported on the lower plate.

10. A disc harrow as set forth in claim 9, wherein said upper connector plate substantially spans the distance between said inside longitudinal intermediate frame members whereby the latter constitute, in effect, edge guide means for the connector plate to confine the same in a longitudinal path of shifting movement.

* * * * *